Jan. 5, 1943.   B. WEIRAUCH   2,307,721
MACHINE FOR CUTTING BEANS AND OTHER ELONGATED VEGETABLES
Filed April 11, 1941
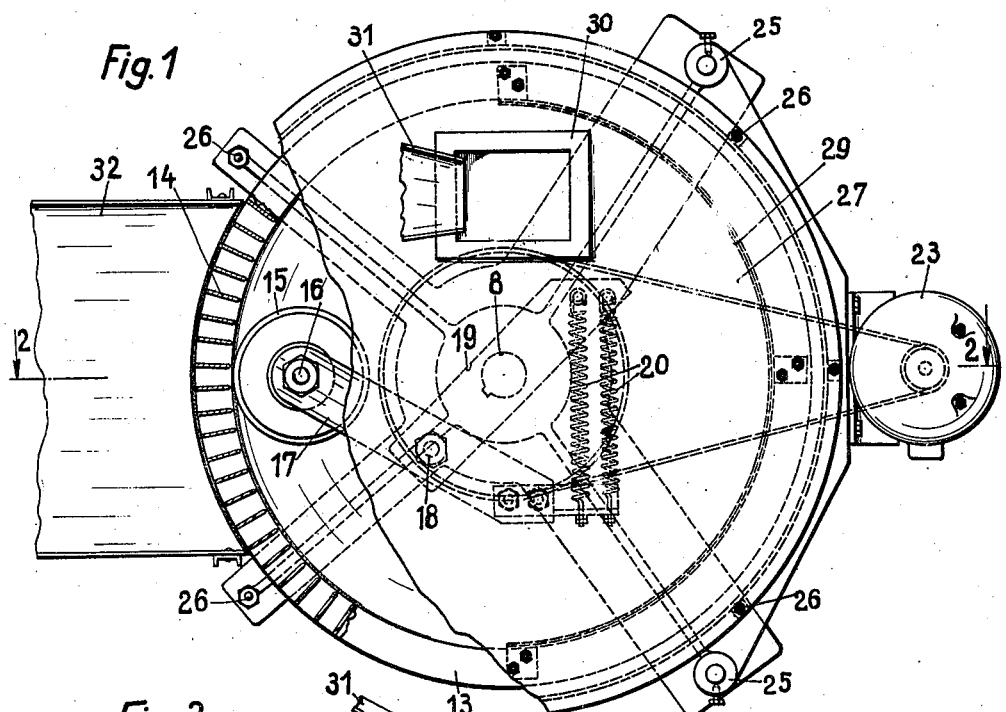
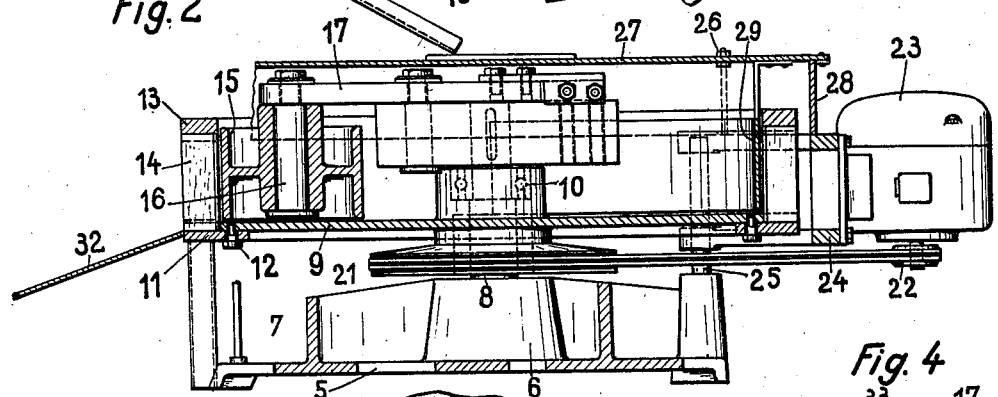
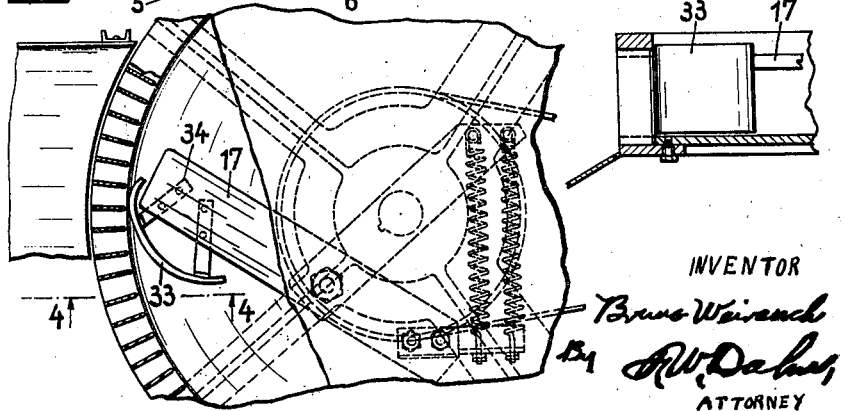
INVENTOR
Bruno Weirauch
By A. W. Dahms
ATTORNEY Patented Jan. 5, 1943

2,307,721

UNITED STATES PATENT OFFICE 2,307,721

MACHINE FOR CUTTING BEANS AND OTHER ELONGATED VEGETABLES

Bruno Weirauch, Brunswick, Germany; vested in the Alien Property Custodian

Application April 11, 1941, Serial No. 388,177
In Germany September 12, 1940

3 Claims. (Cl. 146—93)

My invention relates to improvements in machines for cutting beans and other elongated vegetables, and the object of the improvements is to provide a machine which consists of a cylindrical container mounted for rotating about an upright axis and provided circumferentially with radial blades, a member for arranging the vegetables longitudinally on the inner circumference on the said container and into position for being cut by the said blades, and means for pressing the vegetables onto the blades for cutting the same, the said blades being disposed at distances such that the vegetables are cut into pieces of the desired length. With this object in view my invention consists in the matters to be described hereinafter and particularly pointed out in the appended claims.

For the purpose of explaining the invention an example embodying the same has been shown in the accompanying drawing in which the same reference characters have been used in all the views to indicate corresponding parts. In said drawing, Fig. 1 is a top plan view of the machine, the cover being partly broken away, Fig. 2 is a sectional elevation taken on the line 2—2 of Fig. 1, Fig. 3 is a top plan view similar to the one illustrated in Fig. 1 and showing a modification, and Fig. 4 is a detail sectional view on an enlarged scale taken on the line 4—4 of Fig. 3.

In the example shown in Figs. 1 and 2 the machine comprises a base plate 5 cast integral with a hub 6 and radial ribs 7, a vertical shaft 8 fixed to the hub, a turntable 9 rotatably mounted on the shaft 8 by means of anti-friction bearings 10, a ring 11 fixed to the turntable 9 by means of screws 12, a ring 13 spaced from the ring 11, vertical blades 14 disposed radially between the rings 11 and 13 and fixed thereto in a suitable way for example by soldering, a roller 15 disposed within the container provided by the parts 9, 11, 13 and 14 with its axis vertical and in position for engaging the inner circumference of the said container. The roller 15 is rotatably mounted on a shaft 16 secured to a lever 17 pivotally mounted at 18 on an arm 19 fixed to the upper end of the shaft 8, springs 20 being attached to the said lever 17 and the arm 19 for elastically pressing the roller 15 outwardly and into engagement with the wall of the said container. On the shaft 8 a pulley 21 is rotatably mounted, which is fixed to the turntable 9, and which is connected with a pulley 22 carried by the armature of an electric motor 23, the said electric motor being adapted to impart rotary movement to the turntable 9 and the rings 11 and 13 connected therewith. The electric motor is fixed to a member 24 supported on the base plate 5 by means of vertical rods 25. On vertical rods 26 rising respectively from the base plate 5 and the member 24 a lid 27 is mounted which carries a downwardly directed flange 28 covering the upper part of the container 9, 11, 13, and from the said lid there depends a segmental plate 29 which covers about one half of the inner circumference of the said container and the blades passing along the same. The lid is formed with an opening 30 located at one end of the said plate 29, and above the said hole there is a chute 31 by means of which the vegetables are supplied to the machine.

In the operation of the machine the container 9, 11, 13 is rotated clockwise. The hole 30 is located at the beginning of the segmental plate 29 taken in the direction of the rotation of the container. Elongated vegetables such as beans are supplied into the container through the hole 30, and they fall on the turn-table 9 and are thrown outwardly thereby by centrifugal action so as to arrange themselves longitudinally on the circumference of the segmental plate 29. The beans are gradually conveyed in the direction of the rotation of the container 9 by their frictional engagement with the turn-table 9 and finally they leave the segmental plate and get on the blades 14. By the said blades they are carried into position for engagement with the roller 15, which forces the same onto the blades 14, so that they are cut into pieces of the desired length. The cut beans are ejected from the spaces between the blades by centrifugal action, and they are collected on a chute 32. Should the cut beans be held between the blades they take part in the rotation of the container and, after a complete rotation they are again brought into position for being acted upon by the roller 15, whereupon they are pressed outwardly by a new supply of beans pressed through the blades by the said roller.

Should hard matter get between the roller 15 and the blades the roller yields inwardly by reason of the elasticity of the springs 20.

In Figs. 3 and 4 I have shown a modification of the machine. The general construction of the machine is the same as that of the construction shown in Figs. 1 and 2 and the same reference characters have been used to indicate corresponding parts. As distinguished from the example shown in Figs. 1 and 2 the means for pressing the beans outwardly and onto the blades 14 are in the form of a curved plate 33 fixed to the lever 17 by means of brackets 34.

I claim:

1. A machine for cutting elongated vegetables, comprising a container mounted for rotation about an upright axis, spaced inwardly directed blades distributed around the circumference of said container, means within said container for arranging the vegetables supplied to the container longitudinally on the inner edges of said blades, and means for pressing said vegetables against the said blades, characterized by means for arranging the vegetables longitudinally on the blades which means is in the form of a segmental plate positioned to cover a part of the inner circumference of said container of the blades passing along the said plate, and in which means are provided for supplying the vegetables taken in the direction of the rotation of said container at the beginning of said plate.

2. A machine for cutting elongated vegetables into shorter pieces, comprising a container mounted for rotation on an upright axis, spaced radial blades about the circumference of the container, means for feeding vegetables into said container, a guard covering the cutting edges of said blades at the feeding point and for a sufficient distance following said point to permit said vegetables to arrange themselves longitudinally of a series of said blades under the action of centrifugal force, and means for pressing said vegetables against said blades after passing beyond said guard.

3. A device as in claim 1, said pressing means being yieldably mounted.

BRUNO WEIRAUCH.